United States Patent
Rahn et al.

(10) Patent No.: US 11,157,656 B2
(45) Date of Patent: Oct. 26, 2021

(54) METHOD AND SYSTEM FOR SOFTWARE IMAGE VERIFICATION USING A NULL FILE

(71) Applicant: Arista Networks, Inc., Santa Clara, CA (US)

(72) Inventors: Ethan Barnett Rahn, Thousand Oaks, CA (US); Michelle Binlu Wang, San Ramon, CA (US); Baptiste Elie Franck Covolato, Vancouver (CA); Julien André Alexis Gomes, Vancouver (CA); Robert Eugene Gilligan, Burlingame, CA (US)

(73) Assignee: Arista Networks, Inc., Santa Clara, CA (US)

( * ) Notice: Subject to any disclaimer, the term of this patent is extended or adjusted under 35 U.S.C. 154(b) by 325 days.

(21) Appl. No.: 16/263,583

(22) Filed: Jan. 31, 2019

(65) Prior Publication Data
US 2020/0250344 A1    Aug. 6, 2020

(51) Int. Cl.
*G06F 21/64* (2013.01)
*G06F 8/61* (2018.01)
*H04L 9/32* (2006.01)
*G06F 21/57* (2013.01)

(52) U.S. Cl.
CPC .............. *G06F 21/64* (2013.01); *G06F 8/63* (2013.01); *G06F 21/575* (2013.01); *H04L 9/3236* (2013.01); *H04L 9/3247* (2013.01)

(58) Field of Classification Search
CPC ... H04L 9/3236; H04L 9/3247; G06F 21/575; G06F 8/63; G06F 21/64
USPC .......................................................... 713/176
See application file for complete search history.

(56) References Cited

U.S. PATENT DOCUMENTS

| | | | | |
|---|---|---|---|---|
| 2008/0244554 A1* | 10/2008 | Kadashevich | ........ | G06F 21/572 717/168 |
| 2014/0089660 A1* | 3/2014 | Sarangshar | ............. | H04L 9/321 713/156 |
| 2015/0156024 A1* | 6/2015 | De Los Santos | ..... | H04L 9/3268 713/176 |
| 2017/0286665 A1* | 10/2017 | Miranda | .................. | G06F 21/72 |

OTHER PUBLICATIONS

"Zip File Format Specification", Retrieved from https://pkware.cachefly.net/webdocs/APPNOTE/APPNOTE-6.3.5.TXT, on Oct. 1, 2019, PKWARE, Inc., Nov. 20, 2018. (58 pages).

* cited by examiner

*Primary Examiner* — Bryan F Wright
(74) *Attorney, Agent, or Firm* — Chamberlain, Hrdlicka, White, Williams & Aughtry

(57) ABSTRACT

In general, embodiments relate to methods and systems for signing a software image (SWI), distributing the signed SWI to one or more network devices, and verifying, on a per-network device basis, the signed SWI.

19 Claims, 6 Drawing Sheets

METHOD AND SYSTEM FOR SOFTWARE IMAGE VERIFICATION USING A NULL FILE

BACKGROUND

In order to protect their computer and network infrastructure companies typically take steps to secure their computing devices and network devices. Traditional approaches to securing computing devices and network devices include the use of encryption keys and/or passwords. In addition, certain companies may also restrict physical access to the computing devices and network devices in order to mitigate physical tampering (or unauthorized modifications).

SUMMARY

In general, in one aspect, embodiments relate to method for signing software images. The method includes generating a software image comprising a file segment and a signature segment, wherein the signature segment comprises a Null File, obtaining a signature, wherein the signature is generated using a certificate and a hash value generated from the software image, modifying the software image to replace the Null File with a Signature File to obtain a signed software image, wherein the Signature File comprises the certificate, the signature, and a collision value and, distributing the signed software image to at least one network device, wherein the at least one network device uses the Signature File to verify the signed software image.

In general, in one aspect, embodiments relate to a method for verifying signed software images. The method includes replacing, in a signed software image, a Signature File with a Null File to obtain a software image, verifying the signed software image using: a hash value generated from the software image, and a signature and a certificate in the Signature File, and based on the verifying, enabling a network device to use the software image.

In general, in one aspect, embodiments relate to a network device. The network devices includes a hardware security device comprising a public key associated with a certificate, persistent storage comprising a signed software image, a secure memory comprising a software image verifier, a processor configured to execute the software image verifier, wherein the software image verifier, when executed by the processor performs a method, the method comprising: replacing, in the signed software image, a Signature File with a Null File to obtain an intermediate software image, verifying the signed software image using: a hash value generated from the intermediate software image, a signature and the certificate in the Signature File, and the public key, and based on the verifying, enabling the network device to use the signed software image.

DETAILED DESCRIPTION

Specific embodiments will now be described in detail with reference to the accompanying figures. In the following detailed description of embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment, which may be implemented in addition to, in conjunction with, or in place of the embodiments described with regard to a corresponding like-named component in any other figure.

In general, embodiments relate to methods and systems for signing a software image (SWI), distributing the signed SWI to one or more network devices, and verifying, on a per-network device basis, the signed SWI. Further, embodiments enable in-field updates to the network device such that additional software images (also referred to as custom software images) may be loaded on to the network devices and secured using the signing and verification embodiments discussed herein.

In various embodiments, the SWI is augmented to include a Null File. This Null File is used during the signing of the SWI (see e.g., FIG. 4). The signature of the SWI is then included within a Signature File, which replaces the Null File in the SWI. The resulting SWI, which may be referred to as a signed SWI, may then be ready for distribution. The inclusion of the Signature File within the signed SWI enables an efficient transfer of the information (e.g., the content of the Signature File) that is required to verify the signed SWI (see e.g., FIG. 5) on the network device.

By using the Null File as part of the signing process and then replacing the Null File with the Signature File to generate the signed SWI, embodiments enable the signing of the SWI without requiring modification to the overall SWI format or the modification of the distribution of SWI (which is now a signed SWI).

Figure 1:
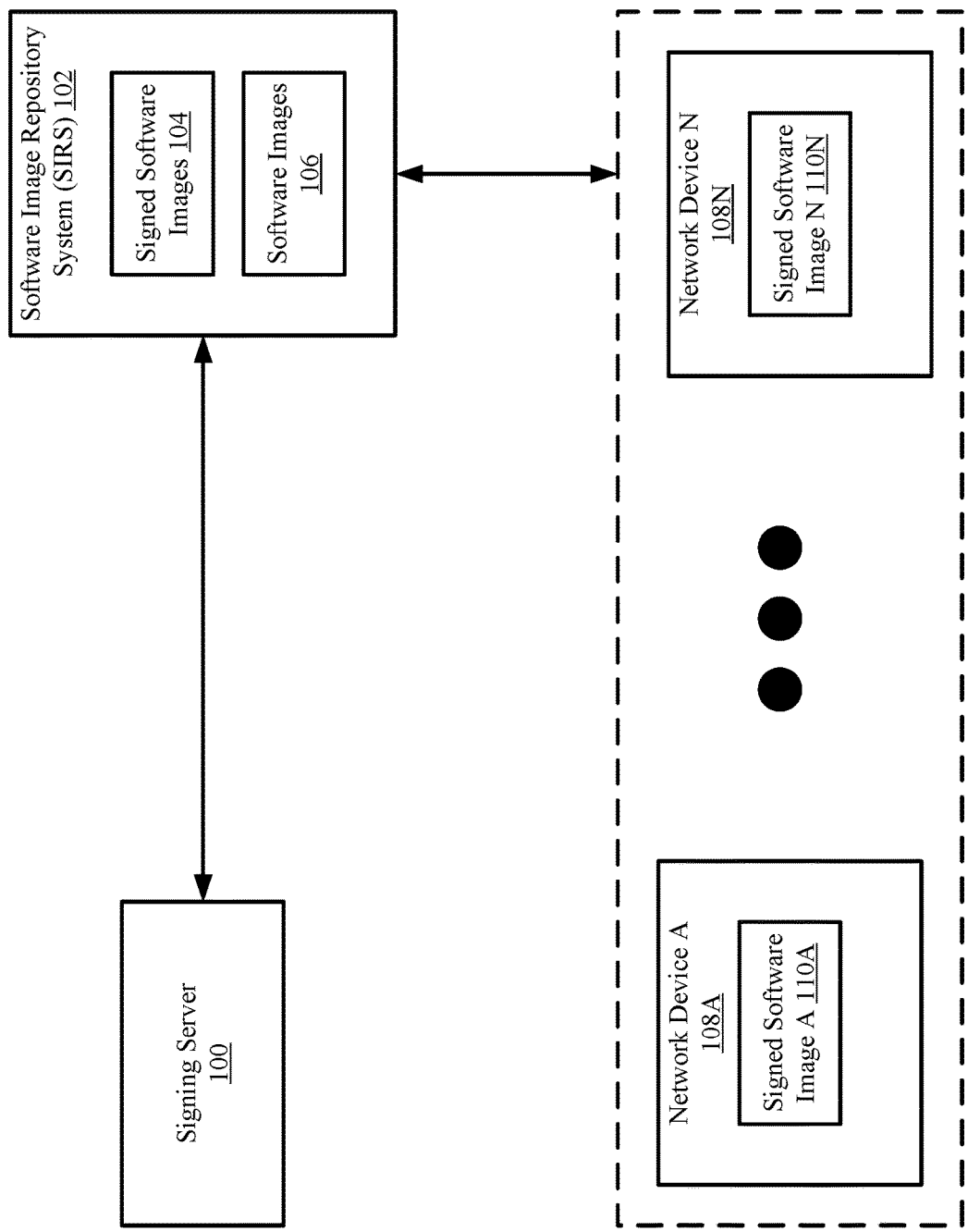
FIG. 1 shows a system in accordance with one or more embodiments.

FIG. 1 shows a system in accordance with one or more embodiments. The system includes a signing server (100), a software image repository system (SIRS) (102), and one or more network devices (108A, 108N). Any of the components of FIG. 1 may be operably connected by any combination of wired and/or wireless networks. For example, the signing server (100) may be operably connected to the SIRS (102) and/or other entities (not shown) by a network (not shown). While for the sake of brevity the system of FIG. 1 has been illustrated as including a limited number of components, embodiments may include additional components than those shown in FIG. 1 without departing from the invention. Each component of the system of FIG. 1 is described below.

In one embodiment, the signing server (100) stores one or more signing certificates that may be used to generate signatures for one or more software images. Each signing certificate includes, among other content, identifying information, a validity period, and a public key. The signing certificate may be a certificate that conforms to the X.509 standard. The embodiments disclosed herein are not limited to signing certificates that conform to X.509 standard. For each signing certificate, the signing server may include a private key, i.e., a private key that is associated with the public key in the corresponding signing certificate. The private keys are stored in a secure manner and are not included within the signing certificate. Further, distribution of the private keys outside of the signing server is typically only permitted in very limited circumstances. Continuing with the discussion of signing certificates, the signing certificates may themselves be signed by a parent certificate (e.g., a certificate associated with the entity that developed and/or is distributing the software image). The signing of the signing certificates by a parent certificate(s) may be performed on a server that is external to the signing server and, as such, the private key(s) associated with the parent certificate(s) is not stored on the signing server. The parent certificate may be self-signed or may be signed by another certificate. In the latter scenario, embodiments may include a hierarchy of certificates, where each of the certificates (starting at the signing certificate) is signed by another certificate (e.g., a parent certificate), which is itself signed by another certificate (e.g., its parent certificate). There may be any number of certificates in the hierarchy of certificates. The last, root, or top-level certificate in hierarchy of certificates may be self-signed.

The signing server includes functionality to sign (i.e., generate signatures for) software images using the aforementioned private keys. The signing server may include functionality to track which software images are signed, the signing certificate used to sign each of the software images, and the individual or entity that requested the signing of the software images.

Figure 6:
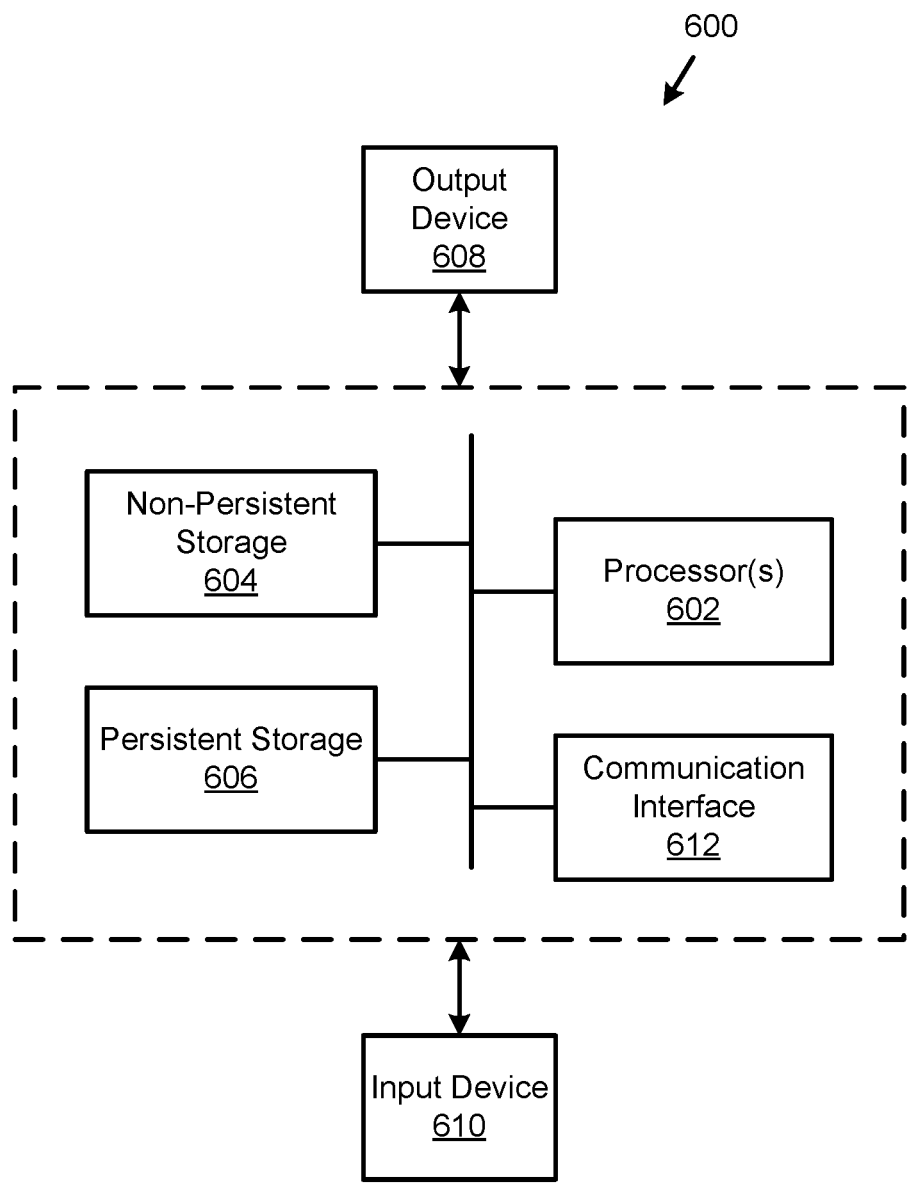
FIG. 6 shows a diagram of a computing device in accordance with one or more embodiments.

In one or more embodiments, the signing server is a physical device. The physical device may be a computing device. The computing device may be, for example, a desktop computer, server, cloud resource, mobile phone, tablet computer, or laptop computer. The computing device may include one or more processors, memory (e.g., random access memory), and persistent storage (e.g., disk drives, solid state drives, etc.). An example computing device is shown in FIG. 6. The persistent storage may store computer instructions, e.g., computer code, that when executed by the processor(s) of the computing device cause the computing device to perform the functions of the signing server described in this application and/or all, or a portion, of the method illustrated in FIG. 4. The signing server (100) may be implemented using other types of computing devices without departing from the invention.

While the signing server (100) has been described as being a physical device, the signing server (100) may be implemented as a logical device, e.g., a virtual machine or container, which utilizes computing resources of other physical computing devices (see e.g., FIG. 6) without departing from the invention.

Continuing with the discussion of FIG. 1, in one embodiment, the software image repository systems (SIRS) (102) stores one or more software images (106) and one or more signed software images (104). Further, the SIRS may include functionality to generate signed software images (104), e.g., as described in FIGS. 3 and 4. The SIRS may also include functionality to distribute the signed software images (106) and/or make the signed software images available for distribution. In the former scenario, the SIRS may "push" (or otherwise initiate the transfer of) the signed software images to one or more network devices. In the latter case, the SIRS may enable the network devices to "pull" (or otherwise initiate transfer of) the signed software images from the SIRS.

While the SIRS may enable automated distribution of signed software images (e.g., via a push or pull mechanism), in other embodiments there may be no network connectivity between the SIRS and the network devices. In this scenario, a user (e.g., an administrator) may obtain the signed software images from the SIRS and then manually load the signed software images on to (or otherwise transfer the signed software images on to) the network devices. Those skilled in the art will appreciate that other mechanisms may be used to transfer (or load) the signed software images on to the network devices without departing from the invention.

In one or more embodiments, the SIRS (102) is a physical device. The physical device may be a computing device. The computing device may be, for example, a desktop computer, server, cloud resource, mobile phone, tablet computer, or laptop computer. The computing device may include one or more processors, memory (e.g., random access memory), and persistent storage (e.g., disk drives, solid state drives, etc.). An example computing device is shown in FIG. 6. The persistent storage may store computer instructions, e.g., computer code, that when executed by the processor(s) of the computing device cause the computing device to perform the functions of the SIRS described in this application and/or all, or a portion, of the methods illustrated in FIG. 4. The SIRS (102) may be implemented using other types of computing devices without departing from the invention.

While the SIRS (102) has been described as being a physical device, the SIRS (102) may be implemented as a logical device, e.g., a virtual machine or container, which utilize computing resources of other physical computing devices (see e.g., FIG. 6) without departing from the invention.

In one embodiment, while the signing server and the SIRS are shown as distinct systems, the signing server and the SIRS may be implemented on a single physical device or logical device (as described above). Further, while the system in FIG. 1 shows a single signing server and a single SIRS, embodiments may be implemented using multiple signing servers and/or multiple SIRS without departing from the invention.

Continuing with the discussion of FIG. 1, in one embodiment, the network devices (108A, 108N) include functionality to process packets in order to facilitate communication between devices (not shown) over a network (e.g., a local area network or a wide area network). The signed software images (110A-110N) include the computer readable instructions, which when executed by the network devices, enable the network devices to perform the aforementioned processing. In one embodiment, the network devices include functionality to perform the method shown in FIG. 5 in order to validate (or verify) the signed software images prior to its installation and/or execution. By validating the signed software images prior to their installation or execution, the network device is able to confirm that it is executing a valid software image as opposed to a malicious software image (i.e., a software image that may negatively impact the operation of the network device and/or the operation of other devices (which may be other network devices) operatively connected to the network device). Additional detail about the network devices is provided below in FIG. 2.

Figure 2:
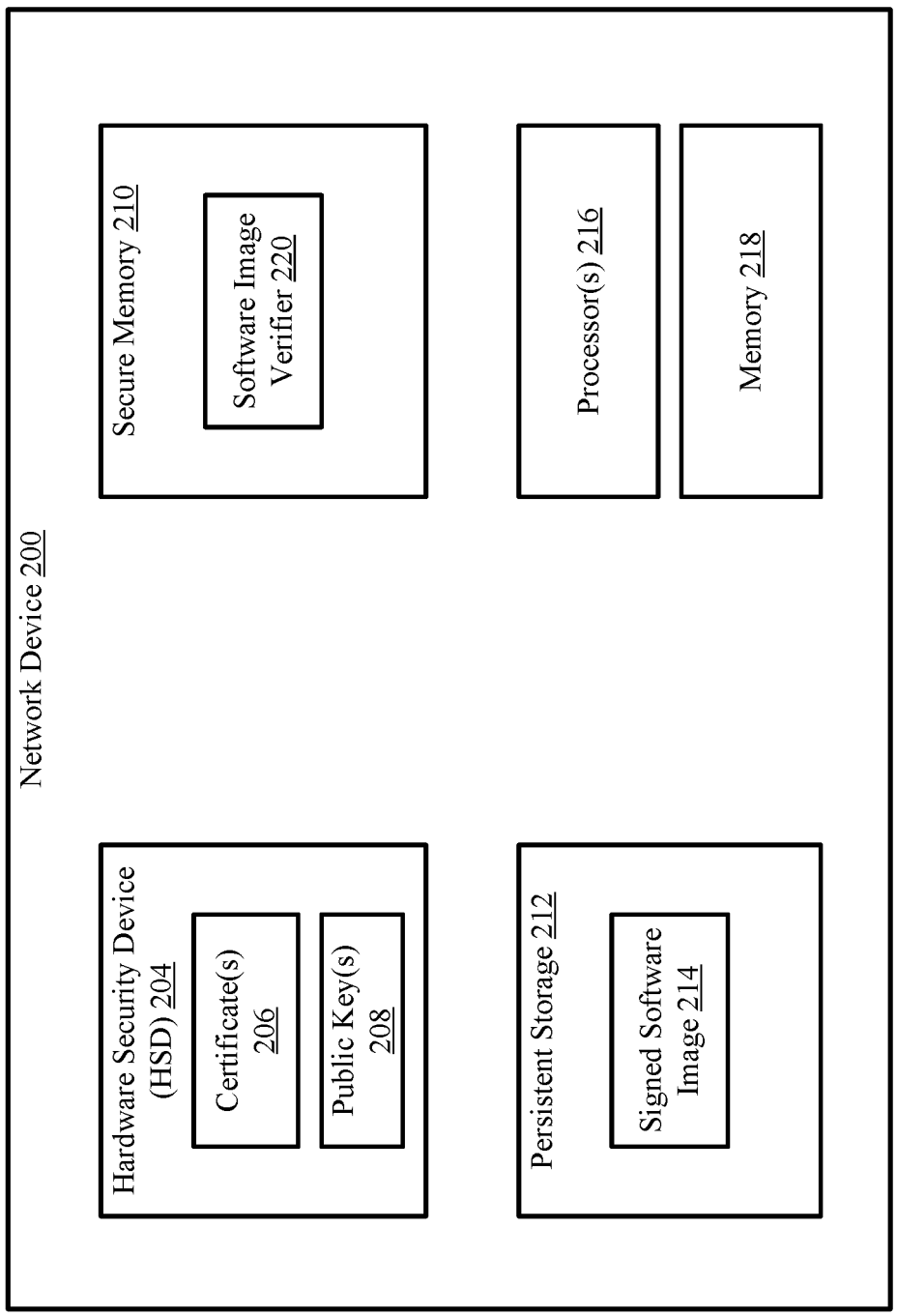
FIG. 2 shows a network device in accordance with one or more embodiments.

FIG. 2 shows a network device in accordance with one or more embodiments. In one embodiment, the network device (200) may be a physical device that includes a hardware security device (204), secure memory (210), persistent storage (212) (defined above), one or more computer processors (216) (including, e.g., a central processor, a switch chip, and/or network processor), memory (218), and two or more physical network interfaces (not shown). Any of the components of FIG. 2 may be operably connected by any combination of wires (or other physical communication components). Further, while for the sake of brevity the system of FIG. 2 has been illustrated as including a limited number of components, embodiments may include additional components to those shown in FIG. 2 without departing from the invention. Each component of the system of FIG. 2 is described below.

In one embodiment, the processor(s) (216) may be programmed to determine out of which physical network interface on the network device (200) to forward data packets. To that end, the processor(s) may include logical egress and ingress network interfaces that may connect to physical network interfaces on the network device (200). Furthermore, the network device (200), using the processor(s) (216), signed software image (214), and the memory (218) (e.g., any volatile memory including, but not limited to, Dynamic Random-Access Memory (DRAM), Synchronous DRAM, SDR SDRAM, and DDR SDRAM), may include functionality to receive data packets via one or more physical network interfaces, and determine whether to: drop the data packets; process the data packets based on the configuration of the network device (200); and/or send data packets, based on or following their processing, out one or more other physical network interfaces towards one or more destinations. By way of examples, the network device (200) may represent a switch, a router, or a multilayer switch. Further, the network device (200) is not limited to the aforementioned specific examples.

In one embodiment, how the network device (200) makes a determination of whether to drop data packets and/or send data packets to other network devices or other physical or logical devices connected to the network device, at least in part, depends on whether the network device (200) is a layer-2 (L2) switch or a layer-3 (L3) switch (also referred to as a multilayer switch), which may perform at least some functions of a router. In one embodiment, if the network device (200) is operating as a L2 switch, the network device (200) may use the destination MAC address along with a forwarding table or policy to determine out of which physical network interface to send data packets. Alternatively, in another embodiment, if the network device (200) is operating as a L3 switch, the network device (200) may use the destination IP address along with a routing table or policy to determine out of which physical network interface to send data packets, and may include the ability to write the MAC address of the next hop (or component) to receive the data packets in place of its own MAC address (which the last hop or component to send the data packets wrote) in the L2 information encapsulating the data packets. Moreover, in yet another embodiment, if the network device (200) is operating as a multilayer switch, the network device (200) may include functionality to process data packets using both MAC and IP addresses.

Continuing with the discussion of FIG. 2, in order to protect the network device, or to at least mitigate malicious use of the network device, the network device may employ various security features. These security features include a hardware security device (204), a secure memory (210), and the signed software image (214).

In one embodiment, the hardware security device (204) may include a cryptographic processor (not shown), a secure input/output (IO) interface (not shown) (to enable communication with other components in the network device), and persistent memory (not shown) (which may store various certificates (206) (described above) and various cryptographic keys, e.g., public keys (208)). In one embodiment, the cryptographic processor may include functionality to encrypt and decrypt data using the cryptographic keys (e.g., a numeric, alpha, or alphanumeric value) and generate hash values (e.g., using a hash function). The hardware security device may be implemented in a manner that conforms to one or more Trusted Computing Group Trusted Platform Module specifications.

In one embodiment, the hardware security device is programmed during the manufacturing process of the network device. The programming includes loading the appropriate certificates and public keys (which may be included within the certificates) into the hardware security device. The certificates and public keys loaded into the hardware security device correspond to the certificates and public keys required as part of the validation process performed in FIG. 5. The hardware security device may also include functionality to perform at least a portion of the method shown in FIG. 5.

In one embodiment, the hardware security device, once installed into the network device and programmed, is intended to permit very limited modifications. Specifically, because the hardware security device is used to validate the signed software image using the certificates and public keys stored thereon, the validation of the signed software image could be compromised if the hardware security device is modified in an unknown or unauthorized manner. Accordingly, in one embodiment, the hardware security device may only be modified in the field (i.e., after manufacturing), also referred to an in-field modification, by requiring either: (i) physical presence (e.g., physically asserting a pin on the hardware security device using a jumper, depressing a push button on the network device, etc.) or (ii) software presence (e.g., accessing the hardware security module only using the software image verifier). Other secure methods for modifying the hardware security device in the field may be implemented without departing from the invention.

In one embodiment, the hardware security device may include functionality to disable (or bypass) the validation of the signed software image. In such scenarios, the functionality to disable (or bypass) the validation can only be performed via the modification mechanisms outlined above and cannot be performed after the network device is executing the signed software image.

In one embodiment, the secure memory is serial peripheral interface (SPI) flash memory. The secure memory is programmed to persistently store the software image verifier (220) and also to enable execution of the software image verifier from within the secure memory. In one or more embodiments, the secure memory may also include one or more certificates and the corresponding public keys (which may be included within the certificates). The secure memory may be programmed at the time of manufacturing to include the software image verifier and, optionally, one or more certificates and the corresponding public keys (which may be included within the certificates). Further, once programmed, modifications to the secure memory may be restricted. To restrict the modifications to the secure memory, the secure memory may be physically wired to be write-protected. In order for the secure memory to be modified, the physical wiring must be physically changed in order to enable modification. This results in a physical presence requirement (i.e., the need for an individual to be in the physical presence of the network device) in order to modify the secure memory.

One physical wiring approach is to include a specific electrically connected screw during the manufacturing process and to cover the screw with tamper-evident tape. When the screw is inserted, the secure memory remains in write protected mode; however, once the screw is removed (which includes initially breaking the tamper-evident tape) the secure memory may be in write enabled mode; thereby allowing modification of the secure memory as well as physical notification (via, e.g., the tamper-evident tape) that the secure memory has been placed (at least once) into a write enabled mode in the field.

Another physical wiring approach is to provide a wire that is installed and connected to the secure memory during manufacturing. While the wire jumper is connected to the secure memory, the secure memory is write-protected. If a user wants to modify the secure memory in the field, the user needs to cut the wire in order to place the secure memory in a write enable mode (or to disable the write protection). Once the modifications are complete, the user may re-establish the electrical connection between the wire and the secure memory using a jumper. This will result in the secure memory returning to a write protected mode.

In another embodiment, an input/output (I/O) pin (e.g., a general I/O pin) on the hardware security device is electrically connected (e.g., by a wire) to a write-protect pin of the secure memory. The status of the I/O pin in the hardware security device is controlled using a value stored in the memory (not shown) of the hardware security device. By modifying the aforementioned value in the hardware security device, the electrically connected write-protection pin may be enabled or disabled. When the write-protection pin is enabled, the secure memory cannot be modified; however, when the write-protection pin is disabled, the secure memory can be modified. The modification of the hardware security device is restricted, e.g., as discussed above, such that physical presence is required to modify the hardware security device (and in this case the value in the memory on the hardware security device). Using the above mechanism, the hardware security device can operate as a secure toggle to enable and disable write protection of the secure memory.

Other methods for enabling/performing in-field modifications of the secure memory that require physical presence of the user making the modification may be implemented without departing from the invention.

Continuing with the discussion of FIG. 2, the software image verifier (220) includes computer readable instructions which when executed include functionality to validate (or verify) the signed software image (214). To perform the verification the software image verifier may perform all or a portion of the method shown in FIG. 5. The software image verifier may work in combination with the hardware security device to perform the method shown in FIG. 5.

Figure 3:
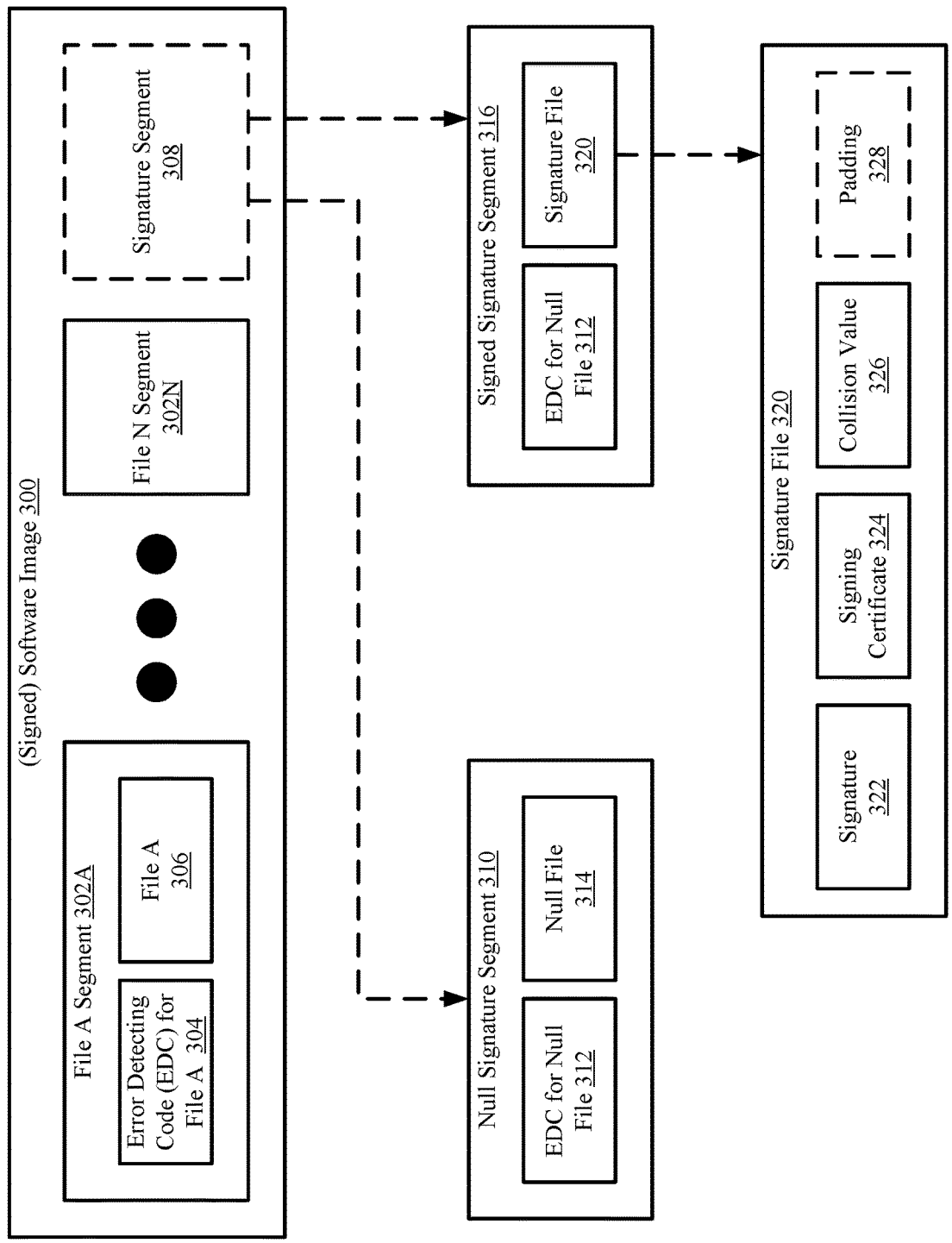
FIG. 3 shows various components of a software image in accordance with one or more embodiments.

FIG. 3 shows various components of a software image in accordance with one or more embodiments. The software image is a single file that is made up (or otherwise composed of) multiple individual files. The multiple individual files may be combined into the single software image using an archive file format. Non-limiting examples of archive file formats include ZIP, SWI, GZIP, and tar. In one embodiment, the archive file format requires that an error detecting code (EDC) is determined for each individual file that is included within the software image. The EDC is then stored with the individual file (which may or may not be compressed) in the software image.

FIG. 3 shows a software image that conforms to the above archive file format requirement. Specifically, the software image (both signed and unsigned) (300) includes one or more file segments (e.g., file segment A (302A), file segment N (302N)). Each file segment (302A, 302N) includes a file (e.g., file A (306)) and an error detecting code (EDC) for the file (e.g., EDC for file A (304)). The EDC corresponds to a bit pattern that is generated for the corresponding file and used to confirm whether or not the file has been corrupted. In one embodiment, the EDC is a bit pattern generated using Cyclic Redundancy Check (CRC) 8, CRC 16, CRC 32, or CRC 64. Other error detecting code algorithms may be used without departing from the invention.

In one embodiment, at least a portion of the information required to verify the software image is included within the software image file as a signature segment (308). The contents of the signature segment (308) varies during the signing process (see e.g., FIG. 4) and the verification process (see e.g., FIG. 5). During the signing process, the signature segment (308) is a Null Signature Segment (310); however, once the signing process is complete the signature segment in the signed software image (300) is a Signed Signature Segment (316).

Like all other segments in the software image, the signature segment must conform to the requirements of the archive file format. Specifically, the Null Signature Segment (310) includes a Null File (314) and an EDC for the Null File (312). The Null File (314) is a placeholder file that may include any content, e.g., all zeros, etc. and the EDC for the Null File (312) is the EDC generated based on the contents of the Null File (314).

After the signature for the software image is generated (see e.g., FIG. 4), the Null File (314) is replaced with the Signature File (320) to obtain the Signed Signature Segment (316). However, while the Null File has been replaced with the Signature file within the Signature Segment, the EDC for the Null File (312) remains in the Signature Segment.

The Signature File (320) includes: (i) the signature (322), which is an encoded version of a hash value (see e.g., FIG. 4) that may be represented (depending on the embodiment) as a binary, octal, numeric, alpha, or alphanumeric value or string, (ii) a signing certificate (324), which is used to generate the signature (322), (iii) a collision value (326) (described below), and (iv) padding (328) (which may or may not be present). The collision value is a value that is included within the Signature File (320) and used to manipulate the EDC for the Signature file until the resulting EDC for the Signature file (320) (which includes the collision value and any padding) matches the EDC for the Null File (314). In one embodiment, the Signature File (320) may be smaller than or equal in length to the Null File (314). If the Signature File (320) is smaller in length than the Null File (314), then an amount of padding (also referred to as a padding amount) is added to the Signature File such that the length of the Signature File (with the padding) is equal to the length of the Null File (314).

The elements of the Signature File shown in FIG. 3 may be concatenated together to generate the Signature File. While the aforementioned elements of the signature are shown in FIG. 3 as being in a particular order, the invention is not limited to the order shown in FIG. 3.

In one embodiment, when the software image includes a Null Signature Segment (310), the resulting software image may be referred to as an intermediate software image. Further, when the software image includes the Signed Signature Segment, the resulting software image may be referred to as signed software image.

Figure 4:
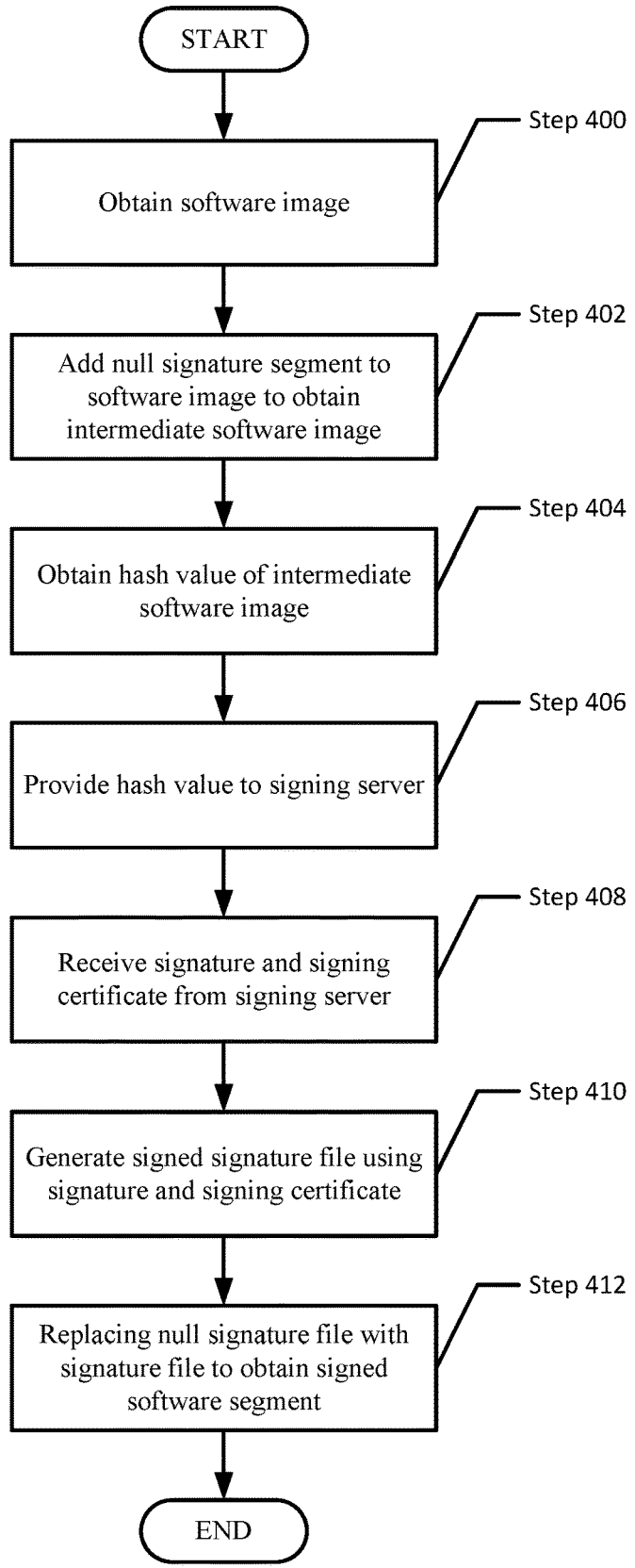
FIG. 4 shows a flowchart of a method for generating a signed software image in accordance with one or more embodiments.

FIG. 4 shows a flowchart of a method for generating a signed software image in accordance with one or more embodiments. The method shown in FIG. 4 may be performed by the software image repository system. While the various steps in the flowchart are presented and described sequentially, one of ordinary skill will appreciate that some or all steps may be executed in different orders, may be combined or omitted, and some or all steps may be executed in parallel.

In step 400, the software image is obtained. In one embodiment, the SIRS includes functionality to generate the software image (i.e., combine the individual files into the software image in accordance with the archive file format). Alternatively, the software image is obtained from another physical or logical computing device (not shown in FIG. 1), where the physical or logical computing device includes functionality to generate the software image.

In step 402, a null signature segment (e.g., 310) in FIG. 3 is added to the software image to obtain the intermediate software image. In one embodiment, the entire null signature segment is added to the software image. In another embodiment of the invention, the Null File is added, using, e.g., an archive file utility (e.g., a ZIP program), to the software image. The result of adding the Null File to a software image results in the generation of the EDC for the Null File, which is then added to the software image. In another embodiment, the null segment is included within the software image that is obtained in step 400. In this scenario, step 400 includes obtaining the intermediate signed software image as opposed to the software image and step 402 is not performed.

In step 404, a hash value of the intermediate software image is generated. The hash value corresponds to a value or string, which (depending on the embodiment) may be represented as a binary, octal, numeric, alpha, or alphanumeric value or string. The hash value may be generated using a hash function. In one or more embodiments, a hash function is a function that includes functionality to receive an input and produce a hash value as output. In one or more embodiments, the hash function may include functionality to convert a variable length input into a fixed length output. For example, the hash function may correspond to SHA-1, SHA-2, SHA-256, MD2, MD4, MD5, any other hash function, or any combination thereof.

In step 406, the hash value is provided to the signing server along with a request to sign the hash value. The request may include the hash value along with identifying information about the software image (which is part of the intermediate software image) being signed. Upon receipt of the request, the signing server signs the hash value. In one embodiment, the hash value is signed as follows: (i) a signing certificate is selected; (ii) the private key associated with the signing certificate is obtained; and (iii) the hash value is encrypted with the private key and an encryption algorithm to obtain a signature. In one embodiment, the encryption algorithm includes functionality to transform the hash value into a signature (i.e., an encrypted format that is unreadable by anyone or anything that does not possess a corresponding public key). For example, the encryption algorithm may correspond to Data Encryption Algorithm (DEA) specified in the Data Encryption Standard (DES), Triple DES, Advanced Encryption Standard (AES), any other encryption algorithm, or any combination thereof. Once the signature has been generated, the signing server records what software image (or intermediate software image) was signed, the individual or entity that sent the request to sign the software image, and identifying information about the signing certificate that was used to generate the signature. The signing server also sends the signature and the signing certificate (or information related thereto) to the SIRS.

In step 408, the signature and the signing certificate are received by the SIRS.

In step 410, a Signature File is generated using the signing certificate and the signature. In addition, a collision value is determined such that the resulting Signature File (which includes the collision value and padding (if required)) generates an EDC that matches the EDC for the Null File. In one embodiment, the collision value may be generated by: (i) selecting a collision value, (ii) calculating the EDC for the Signature File that includes the selected collision value; (iii) determining whether the calculated EDC matches the EDC for the Null file; and (iii) if there is a match, then the collision value has been determined and the process ends; otherwise, a new collision value is selected and the process proceeds to (ii). The generation of the collision value is not limited to the embodiment discussed above. As discussed above, the Signature File may include padding. The padding may only be added in scenarios in which the size of the Null File is greater than the size of the Signature File (with the collision value and without padding).

In step 412, the Null File in the signature segment of the intermediate software image is replaced with the Signature File generated in step 410. The resulting file (which is in an archived file format) is a signed software image.

At this stage, the signed software image, as discussed above, may be automatically or manually distributed to one or more network devices. In one or more embodiments, the signed software image (or portions thereof) may be compressed and/or encrypted (in accordance with the archive file format) prior to the signed software image being sent to distributed to the network devices.

Figure 5:
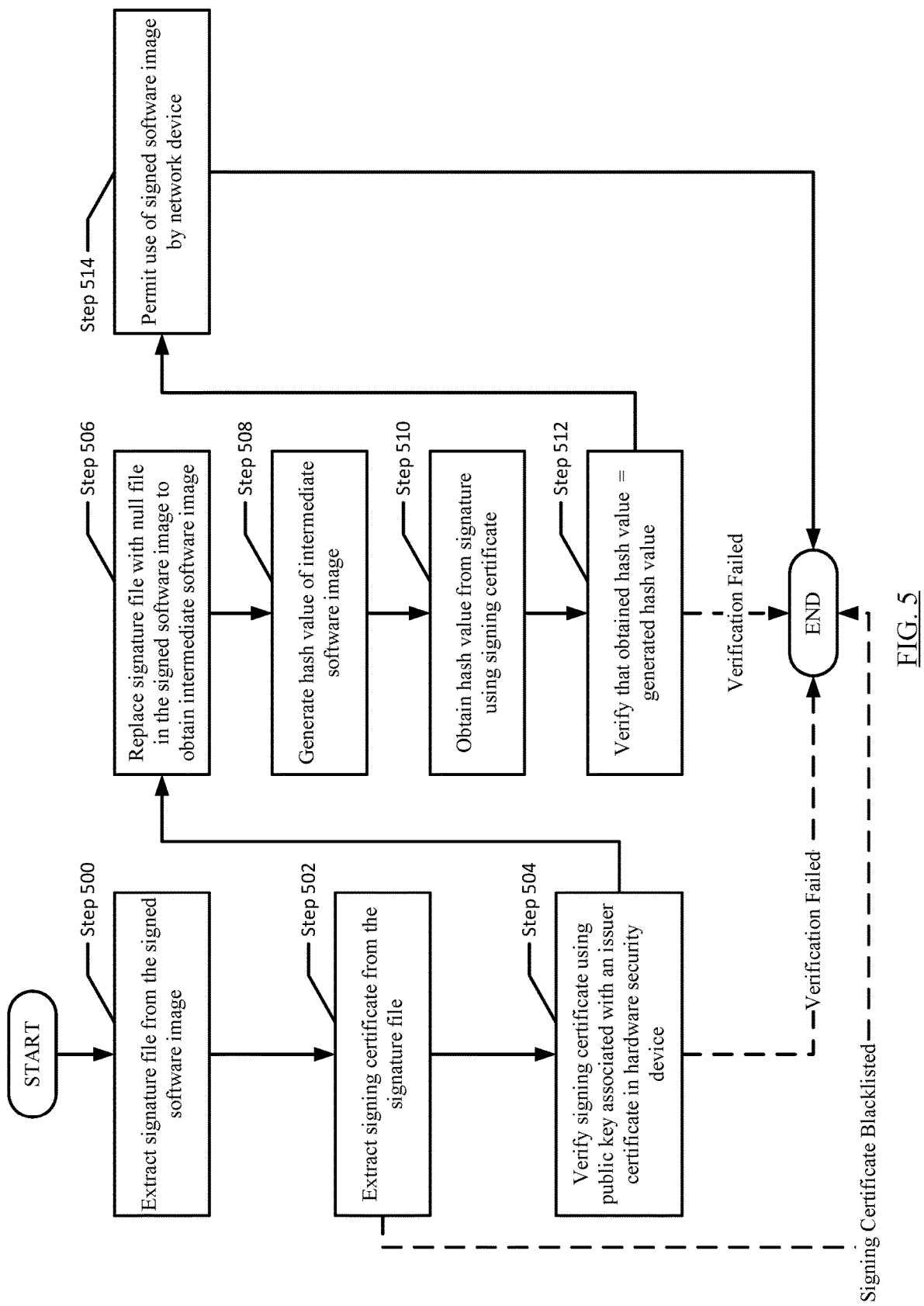
FIG. 5 shows a flowchart of a method for verifying a signed software image in accordance with one or more embodiments.

FIG. 5 shows a flowchart of a method for verifying a signed software image in accordance with one or more embodiments. The method shown in FIG. 5 may be performed by a network device. While the various steps in the flowchart are presented and described sequentially, one of ordinary skill will appreciate that some or all steps may be executed in different orders, may be combined or omitted, and some or all steps may be executed in parallel.

In step 500, the Signature File is extracted from the signed software image. In one embodiment, if portions of the signed software image (including the Signature File) have been compressed and/or encrypted, then the signed software image (or portions thereof) is decrypted and/or uncompressed as necessary. The decryption and/or decompression may be performed by a process executing on the network device. Once the decryption and/or the decompression have been performed, the location of the Signature File in the signed software image may be determined. Once the location is determined, the Signature File may be extracted or otherwise obtained from the signed software image.

In step 502, the signing certificate is obtained from the Signature File. The software image verifier may then determine whether the signing certificate is valid. The signing certificate may not be valid if: (i) it is listed on a certificate blacklist, which may be pre-loaded into the hardware security module or the secure memory; or (ii) the signing certificate has expired. If the signing certificate is not valid the process ends and the user may be notified that the signed software image has not been verified. While Step 502 includes verifying the validity of the signing certificate, in various embodiments the validity of the signing signature is not checked. Further, depending on the implementation of the invention, the software image verifier may prevent further use of the signed software image. However, if the certificate is valid or if the validity of the certificate is not required to be checked, then the process proceeds to step 504.

In step 504, the signing certificate is verified using a parent certificate in the hardware security device or the in secure memory. In embodiments in which the certificates are stored in the hardware security device, the software image verifier sends the signing certificate along with a request for verification to the hardware security device. All processing to perform the verification of the signing certificate is then performed within the hardware security device. The result of the verification process (e.g., success or failure) is then provided to the software image verifier. The verification of the signing certificate is performed using a public key associated with the parent certificate, which is stored in the hardware security device. The verification includes decrypting a signing certificate signature (which is included as part of the signing certificate) using a public key for its parent certificate (i.e., the certificate that is used to sign the signing certificate) to obtain a hash value and then comparing this hash value with a hash value generated by the hardware security device for the signing certificate. If the hash values match, then the signing certificate is verified and the process proceeds to step 506; otherwise the process ends and the user is notified that the signed software image has not been verified. Further, depending on the implementation of the invention, the software image verifier may prevent further use of the signed software image if the signing certificate verification fails.

In another embodiment, if the certificates are stored in the secure memory, then in step 506 the software image verifier may perform the signing certificate verification process in the same or substantially the process as described above with respect to the hardware security device and use the certificates stored in the secure memory.

In another embodiment, the hardware security device may perform the signing certificate verification process as discussed above but use the certificate(s) stored in the secure memory instead of a certificate(s) stored in the hardware security module.

In step 506, the Signature File is replaced with the Null File to generate an intermediate software image. The Null File may be pre-loaded in the secure memory or the hardware security device at the time of manufacturing. In one embodiment, the Null File replaces the Signature File such that after the replacement the Null File is in the same location (relative to the other files in the Signed Software Image) previously occupied by the Signature File.

In step 508, a hash value is generated for the intermediate software image. The hash value is generated using the same hash function that was used to generate the hash value in Step 404. The process in step 508 may be performed by the hardware security device in response to a request from the software image verifier. Alternatively, the software image verifier may generate the hash value.

In step 510, the signature is decrypted using the public key of the signing certificate to obtain a hash value. The process in step 510 may be performed by the hardware security device in response to a request from the software image verifier. Alternatively, the software image verifier may perform the decryption using the public key stored in the secure memory.

In step 512, the hash value generated in step 508 is compared to the hash value obtained in step 510. If the hash values match, the signed software image is deem to be verified. However, if the hash values do not match, then the signed software is not verified and the user is notified that the signed software image has not been verified. Further, depending on the implementation of the invention, the software image verifier may prevent further use of the signed software image if the hash values do not match. The process in step 512 may be performed by the hardware security device in response to a request from the software image verifier. In such cases, the hardware security device provides the result of the matching process (e.g., success or failure) to the software image verifier. Alternatively, the software image verifier may perform the hash value comparison described above.

While steps 508-512 are shown as separate steps, in another embodiment, these three steps may be performed by the hardware security device in response to a single request from the software image verifier.

Continuing with the discussion of FIG. 5, in step 514, the software image verifier permits the network device to take additional steps to install and execute the signed software image, the immediate software image, or the software image (i.e., a software image that does not include any signature segment). In one embodiment, step 514 may include initiation of the remainder of the network device boot process such that the network device can start executing its own operating system (which is based on the files that are part of the software image).

In one embodiment, the method show in FIG. 5 may be performed by the operating system executing on the network device instead of the software image verified. In this scenario, network device would begin execution of the files (e.g., operation system files) within the signed software image and during this execution verify the signed software image from which the aforementioned files were extracted. The operation system may verify the signed software image using the signing certificate (depending on the embodiment, the parent certificate), which may be stored in persistent storage or in another location that is accessible by the operating system during its execution.

In various embodiments discussed above, the network device includes one or more software images that are signed with certificates, where the certificates are programmed into the hardware security device and/or the secure memory at the time of manufacturing. Once the network device is deployed, a user may load its own software image (referred to as a custom software image (CSWI)) onto the network device and secure the CSWI using the signing embodiment shown in FIG. 4 and the verification embodiment shown in FIG. 5.

In this scenario, a user (e.g., a network administrator) may load its own signing certificate (referred to as 3rd party certificate) on to the hardware security device and/or the secure memory using one or more embodiments described above related to in-field modifications of the hardware security device and/or of the secure memory. See e.g., FIG. 2. Further, the user may implement its own instance of a signing server (referred to as a $3^{rd}$ party signing server) (See e.g., FIG. 1, 100) that is configured to sign the CSWI using the $3^{rd}$ party certificate in accordance with the embodiment shown in FIG. 4. The result of the signing process is a signed CSWI.

Once the signed CSWI is loaded onto the network device (e.g., in the persistent storage, FIG. 2, 212), the software image verifier may perform the method shown in FIG. 5 to verify the signed CSWI using the $3^{rd}$ party certificate. In this manner, a user of the network device may leverage the security features of the embodiments shown in FIGS. 1-5 for its own CSWIs.

In various embodiments, the network device may include a combination of signed software images that are provided by the network device vendor as well as signed software images (also referred to as signed CSWIs) that are loaded onto the device by the users of the network device. In these embodiments, the network device may include certificates necessary to verify the signed software images from the network device vendors as well as signed CSWIs.

As discussed above, embodiments may be implemented using computing devices. FIG. 6 shows a diagram of a computing device in accordance with one or more embodiments. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device. The communication interface (612) may include a network adapter or other hardware element that supports communications via any type of networking technology/standard.

In one embodiment, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for signing software images, comprising:
generating a software image comprising a file segment and a signature segment, wherein the signature segment comprises a Null File;
obtaining a signature, wherein the signature is generated using a certificate and a hash value generated from the software image;
modifying the software image to replace the Null File with a Signature File to obtain a signed software image, wherein the Signature File comprises the certificate, the signature, and a collision value; and
distributing the signed software image to at least one network device, wherein the at least one network device uses the Signature File to verify the signed software image,
wherein the file segment comprises a file and an error detecting code (EDC) for the file and the signature segment further comprises an EDC for the Null File.

2. The method of claim 1, further comprising:
generating the hash value by applying a hash function to the software image.

3. The method of claim 1, wherein the signature segment in the signed software image comprises the EDC for the Null File, wherein an EDC for the Signature File is identical to the EDC for the Null File.

4. The method of claim 1, wherein modifying the software image to replace the Null File with the Signature File to obtain the signed software image comprises:
determining the collision value such that an EDC for the Signature File that comprises the collision value matches the EDC for the Null File.

5. The method of claim 4, wherein modifying the software image to replace the Null File with the Signature File to obtain a signed software image further comprises:
determining a padding amount such that a length of the Signature File that comprises padding amount is equal to a length of the Null File,
adding the padding amount to the Signature File.

6. The method of claim 1, wherein the certificate is signed by a parent certificate.

7. The method of claim 1, wherein the signed software image is in an archive file format.

8. A method for verifying signed software images, comprising:
removing, from a signed software image, a Signature File and replacing the Signature File with a Null File to obtain a software image;
verifying the signed software image using:
a hash value generated from the software image that includes the Null File, and
a signature and a certificate in the Signature File; and
based on the verifying, enabling a network device to use the software image.

9. The method of claim 8, further comprising:
loading, on to the network device, a second signed software image signed with a second certificate;
performing an in-field modification of a secure memory on the network device to load the second certificate on to the network device;
verifying the second signed software image using the second signed certificate; and
enabling the network device to use the second signed software image.

10. The method of claim 9, wherein performing the in-field modification of the secure memory comprises using a secure toggle to disable write-protection on the secure memory.

11. The method of claim 8, wherein a length of the Null File is equal to a length of the Signature File.

12. The method of claim 8, further comprising:
prior to verifying the signature, verifying that the certificate is valid.

13. The method of claim 12, wherein verifying that the certificate is valid is performed using a public key stored in a hardware security device or in a secure memory on the network device.

14. The method of claim 8, wherein the verification of the signed software image is performed using a software image verifier stored in a secure memory on the network device.

15. The method of claim 8, wherein the signed software image is in an archive file format.

16. The method of claim 8, wherein the certificate comprises the public key and wherein the public key is used to verify the signed software image.

17. A network device, comprising:
a hardware security device comprising a public key associated with a certificate;
persistent storage comprising a signed software image;
a secure memory comprising a software image verifier;
a processor configured to execute the software image verifier;
wherein the software image verifier, when executed by the processor performs a method, the method comprising:
removing, from a signed software image, a Signature File and replacing the Signature File with a Null File to obtain an intermediate software image;
verifying the signed software image using:
a hash value generated from the intermediate software image that includes the Null File;
a signature and the certificate in the Signature File; and
the public key; and
based on the verifying, enabling the network device to use the signed software image.

18. The network device of claim 17, wherein the secure memory comprises serial peripheral interface (SPI) Flash.

19. The network device of claim 17, wherein the signed software image is in an archive file format.

* * * * *